US005425487A

United States Patent [19]
Saito et al.

[11] Patent Number: 5,425,487
[45] Date of Patent: Jun. 20, 1995

[54] ULTRASONIC TAPE GUIDE APPARATUS

[75] Inventors: Etsuro Saito; Takashi Shimodaira; Shigeru Masuda; Takashi Sasao, all of Kanagawa, Japan

[73] Assignee: Sony Corporation, Tokyo, Japan

[21] Appl. No.: 207,223

[22] Filed: Mar. 3, 1994

Related U.S. Application Data

[63] Continuation of Ser. No. 863,776, Apr. 6, 1992, abandoned.

[30] Foreign Application Priority Data

Apr. 10, 1991 [JP] Japan .................. 3-078013

[51] Int. Cl.$^6$ ............................................. B65H 27/00
[52] U.S. Cl. ..................... 226/196; 226/194; 242/615.3
[58] Field of Search .................. 242/76; 226/190, 194, 226/196, 199

[56] References Cited

U.S. PATENT DOCUMENTS

| | | | |
|---|---|---|---|
| 4,048,861 | 9/1977 | Woidke et al. | 194/194 X |
| 4,573,619 | 3/1986 | Grant | 226/196 |
| 4,875,610 | 10/1989 | Kitamoto et al. | 226/10 |
| 5,152,494 | 10/1992 | Saito | 226/196 |
| 5,295,618 | 3/1994 | Saito | 226/196 |

FOREIGN PATENT DOCUMENTS

| | | |
|---|---|---|
| 0386712 | 9/1990 | European Pat. Off. . |
| 0403651 | 12/1990 | European Pat. Off. . |
| 4-3353 | 1/1992 | Japan . |

*Primary Examiner*—Daniel P. Stodola
*Assistant Examiner*—William Stryjewski
*Attorney, Agent, or Firm*—William S. Frommer; Alvin Sinderbrand

[57] ABSTRACT

A tape guide device includes a guide member of a cylindrical configuration for guiding a tape, a ultrasonic vibrator secured to the guide member for vibrating the guide member in standing-waves configuration and a supporting member for supporting the guide member. A rotation preventing member for preventing a rotation of the guide member is formed on one of a pair of tape position restricting members in the width direction of the tape, whereby the number of the assembly parts of the tape guide device is reduced and a mechanism thereof is simplified. Therefore, the tape guide device can be miniaturized. Also, the structure and the shape of the ultrasonic vibrator are selected so that, even when the tape guide device is miniaturized, a coefficient of friction between the tape and the guide member becomes an optimum value.

9 Claims, 10 Drawing Sheets

F I G. 11
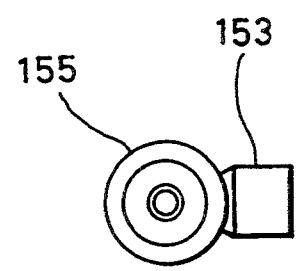

ULTRASONIC TAPE GUIDE APPARATUS

This application is a continuation of application Ser. No. 07/863,776, filed Apr. 6, 1992, now abandoned.

BACKGROUND OF THE INVENTION

1. Field of the Invention

The present invention relates to tape guide apparatus and, more particularly to a tape guide suitable for use in a video tape recorder (VTR) or the like.

2. Description of the Prior Art

Tape guides for use in video tape recorders or the like are roughly classified into rotary tape guides and fixed tape guides.

The rotary tape guides are advantageous in that they impose less resistance to tapes guide thereby. However, the speeds of travel of the tapes guided by the rotary tape guides tend to reflect irregularities in the rotational speeds of bearings used in the rotary tape guides. Furthermore, if the direction in which a tape travels when it is guided by a rotary tape is not perpendicular to the axis of rotation of the rotary tape guide, then the tape is subjected to a transverse force applied by the tape guide. The latter drawback is aggravated when the tape is transversely shifted until an edge thereof is damaged by the contact with a flange of the rotary tape guide, for example. Therefore, rotary tape guides are required to be machined and assembled with high accuracy, and hence cannot be manufactured easily.

The fixed tape guides allow tapes guided thereby to run stably, but present large resistance to the running tapes.

There has been a demand for a fixed tape guide which imposes smaller resistance to a running tape. One of such fixed tape guides that meet such a demand is an air tape guide for ejecting air from small holes defined in the surface of a guide body to float a tape off the guide body for thereby reducing the resistance applied to the tape. The air tape guide is still problematic since a compressor is required as an air pressure source.

To eliminate the drawbacks of the conventional tape guides, the assignee of the present application has previously proposed an ultrasonic vibration tape guide device as disclosed in Japanese Patent Application No. 2-103627. The ultrasonic vibration tape guide device employs an ultrasonic energy to reduce resistance to a running tape while allowing the tape to run stably as with fixed tape guides. The ultrasonic vibration tape guide device is adjustable in height. This previously-proposed ultrasonic vibration tape guide device will be described below with reference to FIG. 1 of the accompanying drawings.

As shown in FIG. 1, the ultrasonic vibration tape guide device, generally designated by the reference numeral 1, includes a main shaft 5 mounted vertically on a base 18, and an ultrasonic vibrator 3 fixed to a guide member 2 that is supported on support teeth 7b of a cylindrical support shaft 7. The assembled body of the guide member 2 and the ultrasonic vibrator 3 is referred to as a guide member system. Lower and upper flanges 9 and 10 are disposed in abutment against lower and upper ends, respectively, of the support shaft 7, for guiding opposite edges of a tape wound around the guide member 2.

The main shaft 5 extends through the lower and upper flanges 9, 10 and the support shaft 7. A height adjustment screw 6 is fitted in an inner surface of the upper end of the support shaft 7, and threaded over a screw 23 formed on the upper end of the main shaft 5.

The upper flange 10 is fastened to an upper end surface of an attachment 8 by a screw 15. The lower flange 9 is fixed to a lower end surface of the attachment 8 by fixing pins 22, 24.

The attachment 8 has an ultrasonic vibrator storage space 8a defined therein which houses the ultrasonic vibrator 3 therein. As shown in FIG, 2 of the accompanying drawings, the ultrasonic vibrator storage space 8a is defined as a hole in the shape of a rectangular parallelpiped between side walls 8b having respective stopper insertion holes 8c defined therein.

Disc-shaped stoppers 39 made of rubber have engaging protrusions 39a fitted respectively in the stopper insertion holes 8c. The ultrasonic vibrator 3 is sandwiched between the stoppers 39 to prevent the guide member 2 from rotating.

The attachment 8 keeps the lower and upper flanges 9, 10 parallel to each other and spaced from each other by a distance that is about 0.1 mm larger than the length of the guide member 2.

As shown in FIG. 1, the lower flange 9 is normally urged upwardly under the bias of a coil spring 35 disposed around the main shaft 5 between the lower flange 9 and the base 18. The base 18 has a pin insertion hole 20 in which there is inserted an end of the fixing pin 22 that projects downwardly from the lower surface of the lower flange 9.

When the height adjustment screw 6 is turned, the guide member 2 is adjusted in height under or against the bias of the coil spring 35.

FIG. 3 of the accompanying drawings shows standing-wave vibrations caused of the guide member 2 when an AC voltage having a frequency corresponding to a resonant frequency of the guide member system is applied to the ultrasonic vibrator 3, the standing-wave vibrations being cut along lines X—X, developed and then illustrated. Dotted lines M—M represents nodes of the standing-wave vibrations on the guide member 2 where the vibrations have zero amplitude. The nodes N on the guide member 2 are axially spaced from the ends of the guide member 2 by the distance n, and the support teeth 7b are also axially spaced from the ends of the guide member 2 by the distance n, i.e., are positioned at the nodes N.

A video tape recorder, which is one of video apparatus employing the tape guide device 1 shown in FIG. 1, is required to become smaller in size recently, and such a demand needs a tape of small size naturally. On this background, the tape guide device 1 is required to be reduced in size. However, if this tape guide device 1 is reduced in size without modification, then various problems arise in the tape guide member as:

The tape guide device 1 shown in FIG. 1 must keep the upper and lower flanges 10 and 9 parallel to each other and spaced from each other by the distance of about 0.1 mm, requiring the attachment 8 of high accuracy and many assembly parts such as screws, pins or the like. As a consequence, a tape guide device becomes large in size and hence cannot be reduced in size as expected.

Further, the upper and lower flanges 10 and 9, which are used to define the transverse direction of the tape, are normally utilized under the condition such that either of the upper and lower flanges 10 and 9 of the tape guide device 1 is brought in contact with the tape. Of the upper and lower flanges 10 and 9, either flange in contact with the tape (upper or lower flange 10 or 9) is made of a hard wear-proof material because it is requested to guide the tape for a long period of time. Such hard wear-proof material is generally difficult to be machined. Further, if the flange made of such material becomes complex in shape, it becomes expensive. For this reason, the previously-proposed tape guide device cannot be reduced in size as described above.

Furthermore, in the tape guide device 1 shown in FIG. 1, the shape of the upper flange 10 for guiding the tape becomes complex as shown in FIG. 2 and is not suitable for making the tape guide device 1 compact in size.

Problems of the guide member vibrating member, i.e., the ultrasonic vibrator 3 are as follows:

The surface of the ultrasonic vibrator 3 on which it is mounted on the guide member 2 is a curved surface of one end portion of a piezoelectric ceramic element defined in correspondence with the diameter of the guide member 2. This curved surface is bonded to the outer circumferential surface of the guide member 2 as shown by a dotted line in FIG. 1.

However, if the curved surface is formed on one end portion of the piezoelectric ceramic element, then positive and negative electrodes are exposed and hence sometimes short-circuited. Further, if the guide member is made of a conductive material, then a short-circuit occurs between the positive and negative electrodes similarly as described above.

Furthermore, since the piezoelectric ceramic element is formed of laminated layers of the piezoelectric ceramic plate and positive and negative electrodes as described above, their surfaces associated with the outer circumferential surface of the guide member 2 cannot be formed with high accuracy and also the piezoelectric ceramic element bonded to the guide member 2 tends to be peeled off. For this reason, the conventional tape guide device is not suitable for the small video tape recorder.

The ultrasonic vibrator 3 has further problems as follows:

A length of the ultrasonic vibrator 3 in the radius direction of the guide member 2, which is in contact with or bonded to and generates standing-waves in the guide member 2 considerably influences the increase or decrease of friction coefficient $\mu$ of friction generated by the contact of the tape with the guide member 2. Accordingly, the length of the ultrasonic vibrator 3 extended along the diametrical direction of the guide member 2 is selected to be enough to minimize the friction coefficient $\mu$ of friction generated by the contact between the tape and the guide member 2.

However, in the tape guide device 1 shown in FIG. 1, the length (shown by reference letter L in FIG. 1) of the ultrasonic vibrator 3 extended along the diametrical direction of the guide member 2 is not selected to be optimum, resulting in efficiency at which the friction generated by the contact between the tape and the guide member 2 is reduced being deteriorated. There is then the disadvantage such that a temperature on the ultrasonic vibrator 3 is increased considerably.

OBJECTS AND SUMMARY OF THE INVENTION

Therefore, it is an object of the present invention to provide an improved tape guide device in which the aforesaid shortcomings and disadvantages encountered with the prior art can be eliminated.

More specifically, it is an object of the present invention to provide a tape guide device in which the number of assembly parts can be reduced and a mechanism thereof can be simplified.

Another object of the present invention is to provide a tape guide device in which efficiency in which a friction generated between a tape and a guide member due to vibration of a ultrasonic vibrator is reduced can be maximized, for thereby providing a small and inexpensive tape guide device.

As a first aspect of the present invention, a tape guide device includes a guide member of a cylindrical configuration for guiding a tape, a ultrasonic vibrator secured to the guide member for vibrating standing-waves and a supporting member for supporting the guide member. A rotation preventing means for preventing a rotation of the guide member is formed on one of a pair of tape position restricting members.

In accordance with a second aspect of the present invention, the ultrasonic vibrator comprises a drive layer which is driven in response to the application of a drive signal and a non-drive layer which is not driven by the application of the drive signal, the non-drive layer being secured to the guide member.

In accordance with a second aspect of the present invention, the length of the ultrasonic vibrator in which the ultrasonic vibrator is attached to the guide member in the diametrical direction is selected such that a coefficient of friction between the guide member and the tape fall in a range of from a minimum value to twice the minimum value.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 11 is a top view of FIG. 10;

DETAILED DESCRIPTION OF THE PREFERRED EMBODIMENTS

The present invention will now be described in detail with reference to the accompanying drawings.

Figure 4:
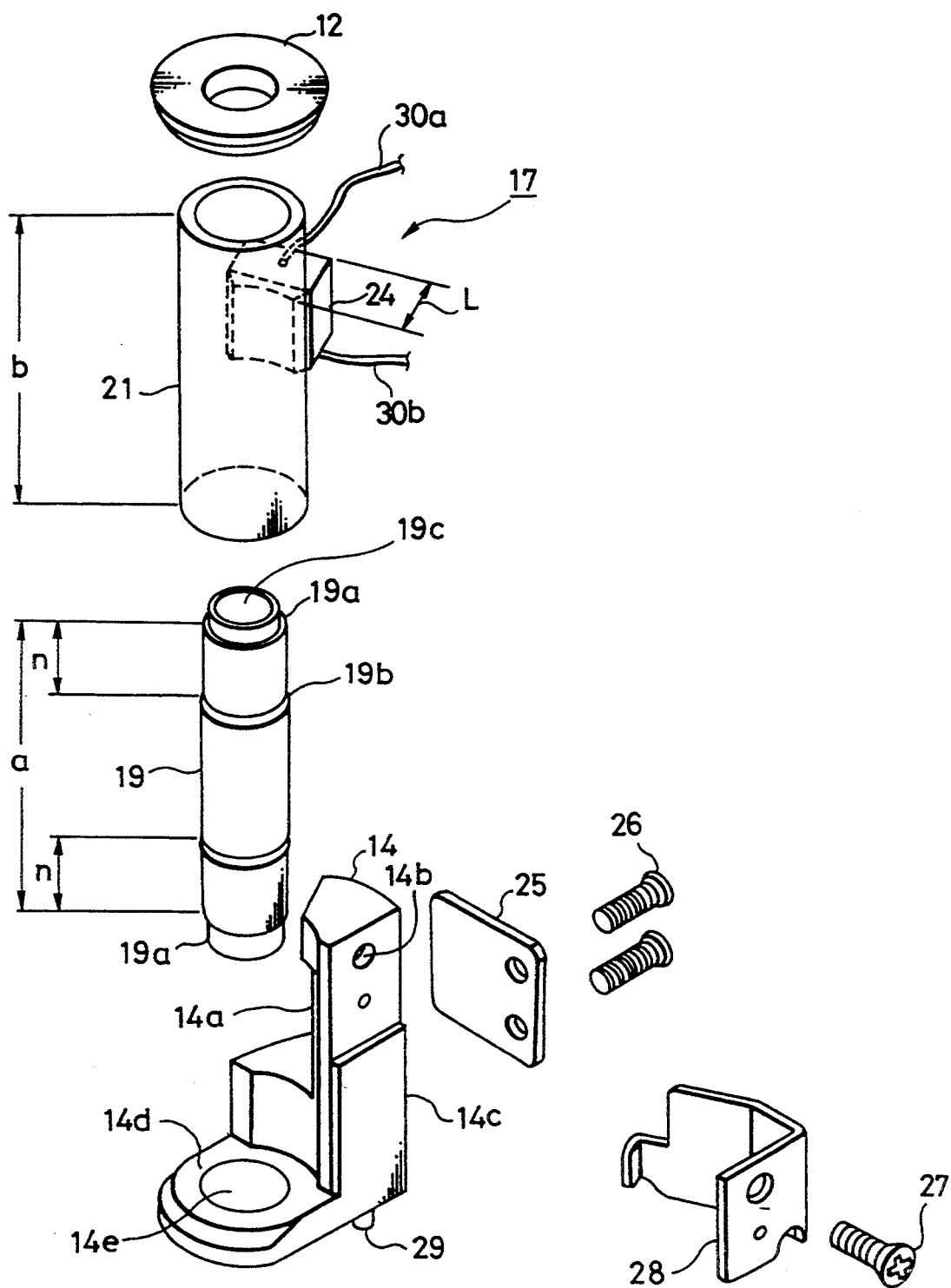
FIG. 4 is a perspective view illustrating a first embodiment of a tape guide device according to the present invention in an exploded view fashion.

FIG. 4 of the accompanying drawings is an exploded perspective view illustrating a first embodiment of a tape guide device according to the present invention.

As shown in FIG. 4, a tape guide device generally depicted by reference numeral 17 includes a ceramic guide member 21, an ultrasonic vibrator 24 and a support shaft 19. Annular supporting protrusions 19b are formed on the outer surface of the support shaft 19 by an equal distance n as shown in FIG. 4. Reference numeral 12 depicts an upper flange (guide flange) and 14 a rotation stop member unitarily formed with a lower flange 14d. A stopper plate 28 is secured to the rotation stop member 14 by fitting a screw 27 into a tapped hole 14d of the rotation stop member 14. An ultrasonic vibrator 24 disposed at a predetermined position of the rotation stop member 14 is held by the stopper plate 28. Further, one end face of the ultrasonic vibrator 24 is bonded to the surface of the guide member 21, for example, for thereby preventing the guide member 21 from rotating. A terminal plate 25 is secured to the rotation stop member 14 by fitting a screw 26 into a tapped hole 14b of the rotation stop member 14. A rotation stop pin 29 is used in connection with a base 32 (see FIG. 5) so as to prevent the tape guide device 17 from rotating.

In the present invention, a material of the guide member 21 is not limited to the above-mentioned ceramic material and the guide member 21 might be formed of a conductive ceramic material mainly made of alumina added with titanium oxide. Thus, the occurrence of static electricity can be avoided for thereby allowing the tape to run stably. When the guide member 21 is made of a conductive material, it is needless to say that a ground material for grounding the guide member 21 must be provided. Further, the supporting protrusion 19b might be made of a soft material such as rubber, plastics or the like. If the supporting protrusion 19b is made of such soft material, then a noise between the guide member 21 and the supporting protrusion 19b can be avoided.

When the tape guide device 17 is assembled, a lower stepped portion 19a formed on the end face of the support shaft 19 is fitted into a hole 14e of the rotation preventing member 14, the guide member 21 is inserted into the support shaft 19, the ultrasonic vibrator 24 is sandwiched between a concave portion 14a of the rotation preventing member 14 and the stopper plate 28, the upper flange 12 is fitted into an upper stepped portion 19a of the support shaft 19 and lead wires 30a, 30b of the ultrasonic vibrator 24 are coupled to the terminal plate 25 by a proper processing such as a soldering or the like, for example. As shown in FIG. 4, in this embodiment, a length a of the support shaft 19 except the stepped portions 19a formed on the respective ends of the support shaft 19 is selected to be longer than a length b of the guide member 21 by about 0.1 mm and is selected to be shorter than a distance between the upper flange 12 and the lower flange 14d by about 0.1 mm.

Figure 5:
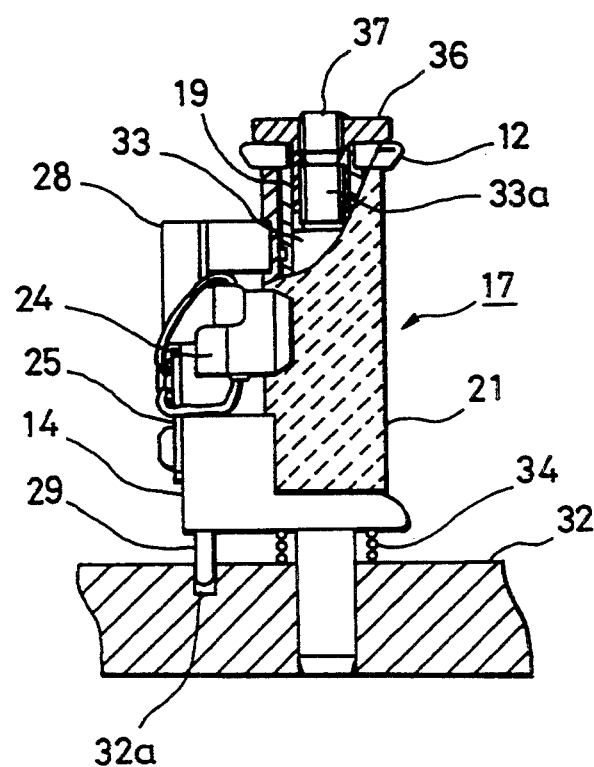
FIG. 5 is a cross-sectional view of the first embodiment of the tape guide device according to the present invention, and to which references will be made in explaining the assembly process thereof.

FIG. 5 of the accompanying drawings shows the case such that the tape guide device 17 is mounted on the base 32 after the assembly process thereof is finished.

Figure 6:
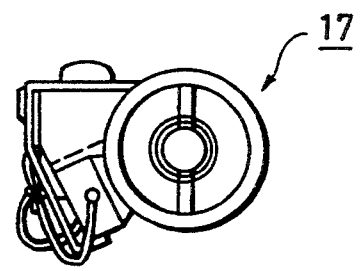
FIG. 6 is a top view of FIG. 5.
Figure 7:
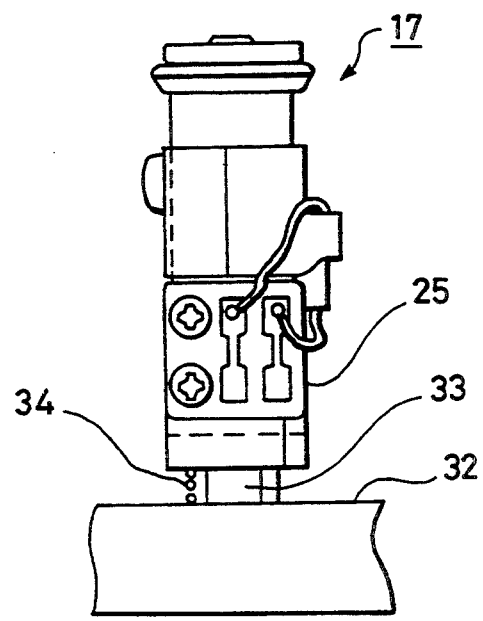
FIG. 7 is a cross-sectional side view illustrating a main portion of the first embodiment of the present invention.

The tape guide device 17 will be described below with reference to FIGS. 5, 6 and 7. In FIGS. 5, 6 and 7, like parts corresponding to those of FIG. 4 are marked with the same references and therefore need not be described in detail.

Referring to FIG. 5, a main shaft 33 (see FIG. 7) is vertically attached to a base 32. A coil spring 34 is inserted into the main shaft 33, a hollow portion 19c (see FIG. 4) of the support shaft 19 of the tape guide device 17 is inserted into the main shaft 33, and the rotation preventing pin 29 is fitted into a hole 32a bored through the base 32. Thereafter, a height adjustment screw 36 is screwed into a screw portion 33a formed on the end portion of the main shaft 33.

When the height adjustment screw 36 is turned, the height of the tape guide device 17 can be adjusted under or against the spring-biasing force of the coil spring 34. The height adjustment range is about 0.5 mm. Since the rotation preventing pin 29 is fitted into the hole 32a of the base 32 by a depth of about 2 mm, for example, the tape guide device 17 can be prevented from rotating about the main shaft 33 during the height thereof is adjusted.

At the completion of the height adjustment, the screw portion 33a of the main shaft 33 is fastened by a locking screw 37, for thereby preventing the height adjustment screw 36 from rotating. FIG. 6 is a top view of the tape guide device 17 shown in FIG. 5, and FIG. 7 is a side view of the tape guide device 17 shown in FIG. 5 as seen in the direction of the terminal plate 25.

When the AC voltage from the video tape recorder body, for example, is supplied to the ultrasonic vibrator 24 through the lead wires 30a, 30b, then standing-waves take place in the guide member 21. A coefficient of friction of a friction generated by the contact of the tape and the guide member 21 when the tape is guided and transported by the tape guide device 17 is reduced to a small fraction of friction as compared with that of a friction generated when the AC voltage is not supplied to the ultrasonic vibrator 24.

Figure 3:
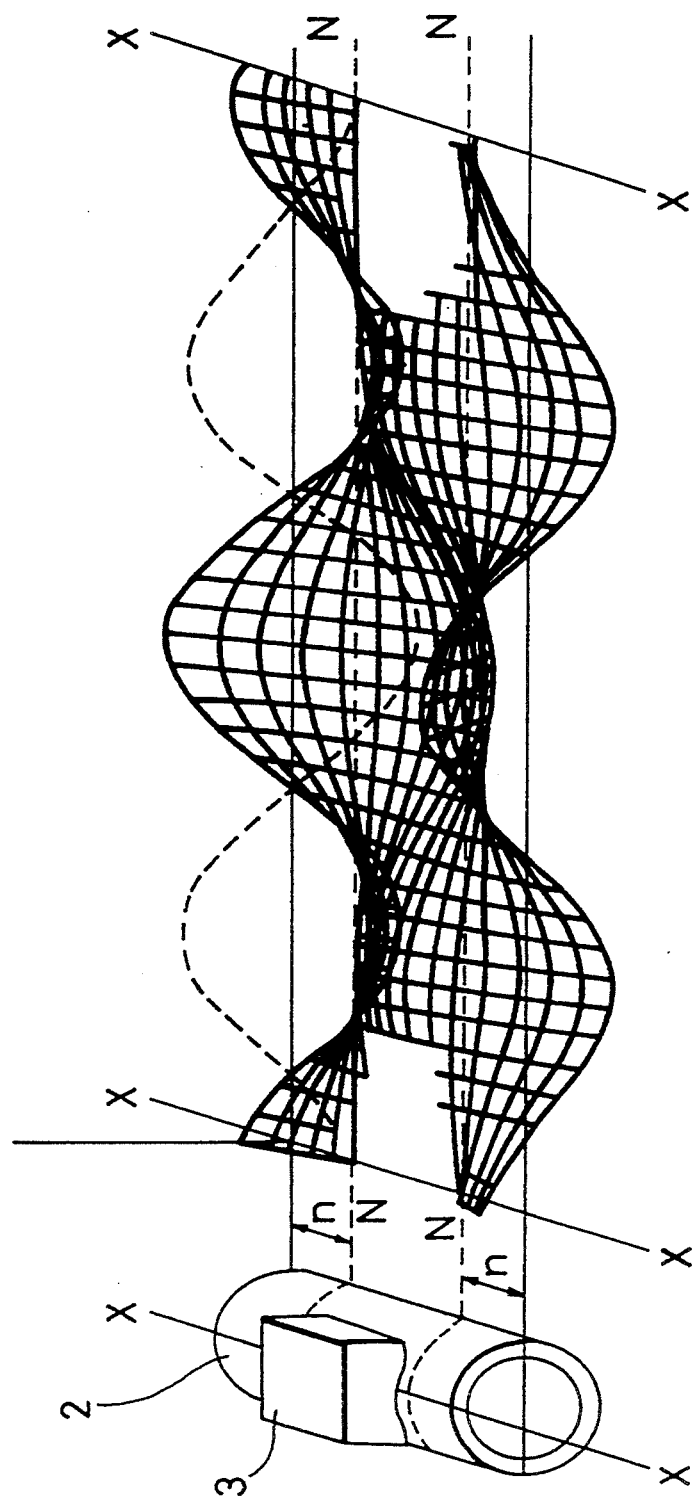
FIG. 3 is graph graphing a vibrating condition of standing-waves used to explain the present invention.

The standing-waves produced in the guide member 21 are represented in FIG. 3. The supporting protrusions 19b in this embodiment are attached to the guide member 21 at the positions distant from the respective end faces thereof by the equal distance of about n as shown in FIG. 4.

Further, the upper flange 12 can be made circular in shape as shown in FIG. 4, and the rotation preventing member 14 can be manufactured by a plastic molding or die casting.

Figure 8:
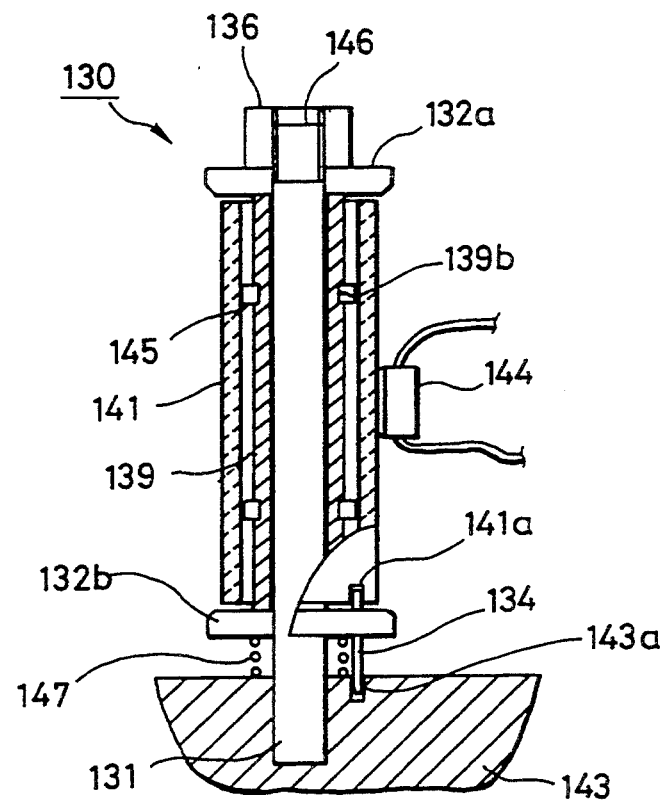
FIG. 8 is a cross-sectional side view illustrating a main portion of a second embodiment of the tape guide device according to the present invention.

FIG. 8 shows a second embodiment of the present invention, in which a tape guide apparatus is generally depicted by reference numeral 130 and a rotation preventing pin 134 is formed on a lower flange 132b. The second embodiment of the present invention will be described with reference to FIG. 8.

Referring to FIG. 8, the tape guide device 130 comprises a base 143, a main shaft 131 attached to the base 143, a guide member 141 made of ceramics, for example, a ultrasonic vibrator 144, a support shaft 139, upper and lower flanges 132a and 132b, resin support rings 145 fitted into a concave portion 139b formed on the support shaft 139 at its predetermined positions, a height adjustment screw 136 engaged with a screw portion 146 formed on the end portion of the main shaft 131, a coil spring 147 and a rotation preventing pin 134 inserted into the lower flange 132b. One end of the rotation preventing pin 134 is fitted into a hole 143a bored on the base 143 and the other end thereof is fitted into a recess 141a formed on the end portion of the guide member 141.

The length of the support shaft 139 is selected to be longer than that of the guide member 141 by about 0.1 mm and is also selected to be shorter than the length between the upper and lower flanges 132a and 132b by about 0.1 mm. The assembly process or the like of this tape guide device 130 is substantially the same as that of the tape guide device 17 shown in FIG. 4 and therefore need not be described in detail.

When the height adjustment screw 136 is turned, then the height of the tape guide device 130 can be adjusted under or against the spring-biasing force of the coil spring 147. The height of the tape guide device 130 can be adjusted in a range of about 0.5 mm. In this case, since the rotation preventing pin 134 is engaged into the hole 143a of the base 143 by a depth of about 3 mm, for example, the tape guide device 130 can be prevented from rotating about the main shaft 131 during the height thereof is adjusted.

Figure 9:
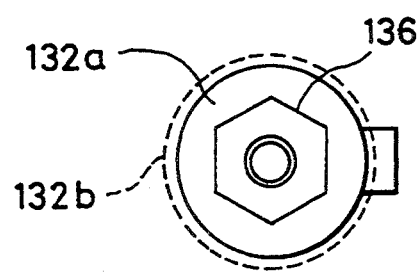
FIG. 9 is a top view of the second embodiment of the tape guide device according to the present invention.

Further, the upper and lower flanges 132a and 132b can be made circular in shape as shown in FIG. 9.

A third embodiment of the present invention will be described below with reference to FIG. 10. In this embodiment, as shown in FIG. 10, a rotation preventing pin 156 is fitted into a boss 154a which also serves as a lower flange.

Figure 10:
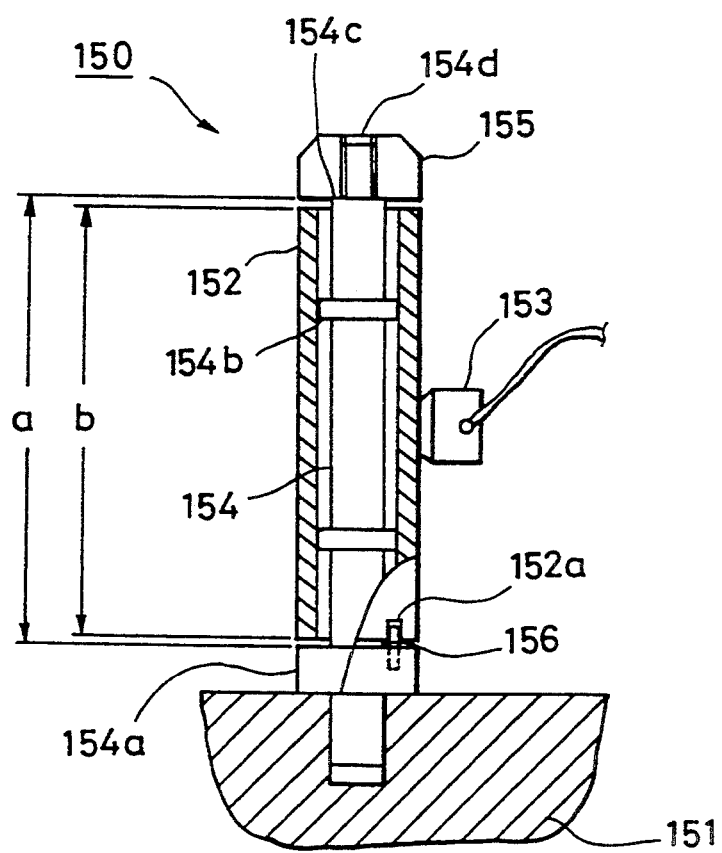
FIG. 10 is a cross-sectional side view illustrating a third embodiment of the tape guide device according to the present invention.

As shown in FIG. 10, a tape guide device 150 comprises a base 151, a main shaft 154 attached to the base 151, a guide member 152 made of ceramics, a ultrasonic vibrator 153, the boss 154a formed on the main shaft 154, supporting protrusions formed on the main shaft 154 at predetermined positions thereof, a lock nut 155 fitted into a screw portion 154d formed on the end portion of the main shaft 154 and a rotation preventing pin 156 vertically provided on the boss 154a. The end portion of the rotation preventing pin 156 is inserted into a recess 152a formed on the end portion of the guide member 152.

As shown in FIG. 10, according to this embodiment, a relation of a distance a between the upper end of the boss 154a and a shoulder portion 154c of the main shaft 154 relative to a length b of the guide member 152 is selected so as to satisfy an equality of a=b+0.1. In this case, the lock nut 155 is stopped at the shoulder portion 154c so that, when the guide member 152 is sandwiched between the upper end of the boss 154a and the lower end of the lock nut 155, a clearance of about 0.1 mm is produced therebetween.

Further, there is a very small clearance between an inner periphery of the guide member 152 and an outer periphery of the main shaft 154, by which the guide member 152 can rotate about the main shaft 154 freely. In this case, however, since the rotation preventing pin 156 is inserted into the recess 152a by a depth of about 0.5 mm, the guide member 152 can be prevented from rotating about the main shaft 154.

As described above, since the rotation preventing mechanism for the guide member of this embodiment is an inventive one, the number of the assembly parts of this tape guide device can be reduced and the mechanism thereof can be simplified, which can provide a small and inexpensive tape guide device.

Figure 12:
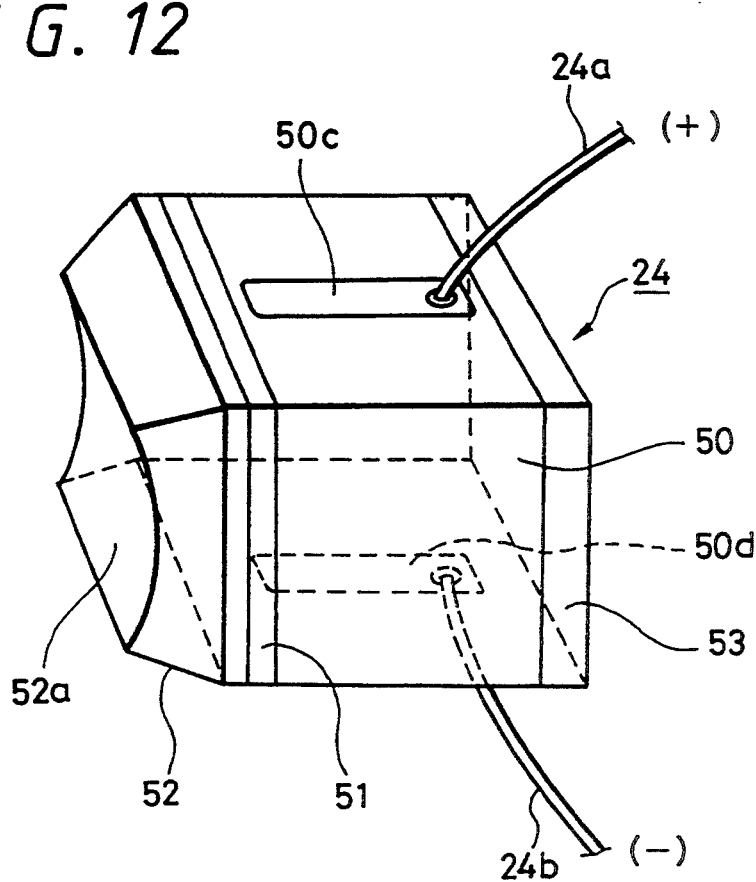
FIG. 12 is a perspective view of a main portion of a fourth embodiment of the tape guide device according to the present invention and illustrating a main portion of a ultrasonic vibrator.
Figure 13:
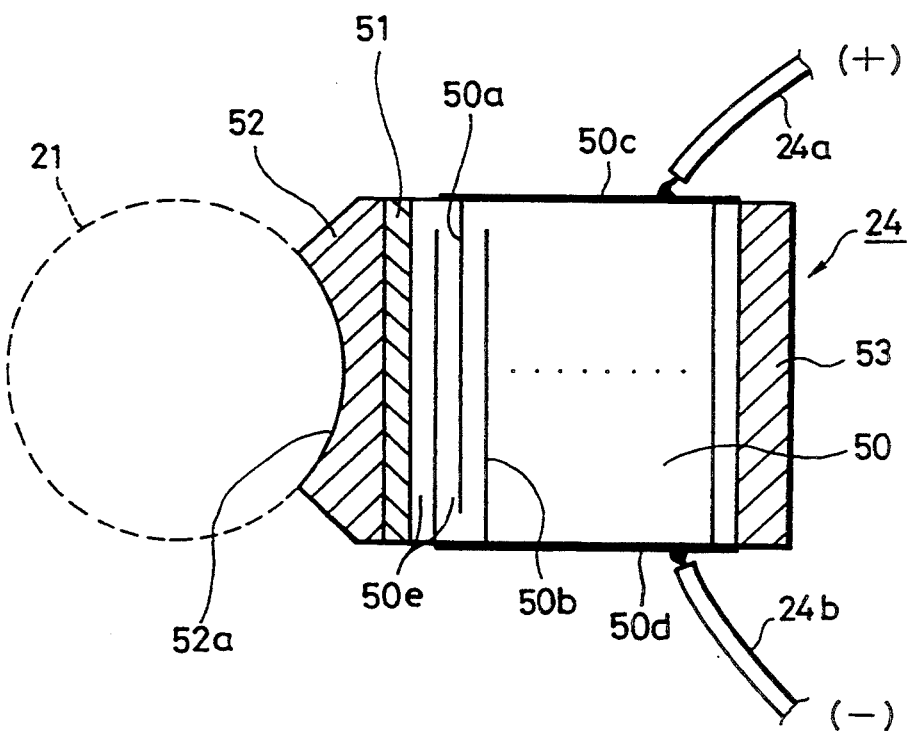
FIG. 13 is a cross-sectional view of a main portion of the fourth embodiment of the tape guide device according to the present invention and illustrating a structure of the ultrasonic vibrator.

In this invention, the ultrasonic vibrator 24, for example, is constructed as shown in FIGS. 12 and 13.

In FIG. 12, reference numeral 50 depicts a piezoelectric ceramic element. As shown in FIG. 12, the piezoelectric ceramic element 50 having a number of piezoelectric ceramic plates 50e with positive and negative electrodes 50a and 50b interposed alternately with a clearance of 0.1 mm therebetween. The positive electrodes 50a are electrically connected to a positive electrode plate 50c located on one side surface, and the negative electrodes 50b are electrically connected to a negative electrode plate 50d located on another side surface.

As shown in FIG. 12, the positive electrode plate 50c is disposed on the upper surface portion of the piezoelectric ceramic element or drive layer 50, a positive electrode side lead wire 24a is coupled to the positive electrode plate 50c, the negative electrode plate 50d is disposed on the lower surface portion of the piezoelectric ceramic element 50 and a negative electrode side lead wire 24b is coupled to the negative electrode plate 50d. A piezoelectric ceramic dummy layer 51 having no electrode, for example, is secured to one end face of the piezoelectric ceramic element 50 and a fixing member or non-drive layer 52 such as an aluminum extrusion molded member, a ceramic molded member or the like is secured to the dummy layer 51. The opposite side of the fixing member 52 in which the fixing member 52 is secured to the dummy layer 51 is formed as a curved fixing surface 52a so as to be secured to the outer circumferential surface of the guide member 21. A piezoelectric ceramic dummy layer 53 having no electrode, for example, is secured to the other end face of the piezoelectric ceramic element 50.

As shown in FIG. 13, one end portion of the ultrasonic vibrator 24, i.e., the side of the ultrasonic vibrator 24 in which the ultrasonic vibrator 24 is secured to the guide member 21 shown by a dotted circle is formed as a conical-shaped portion which is reduced in diameter from the dummy layer 51 side to the fixing surface 52a. The reason for this is to reduce an area of the fixing surface 52a secured to the guide member 21 while keeping a cross section of the piezoelectric ceramic element 50 in order to obtain a drive power. This area of the fixing surface 52a is selected to be 9 mm$^2$ relative to the cross section of 25 mm$^2$ of the piezoelectric ceramic element 50, for example. If the area of the fixing surface 52a is reduced, then the waveform of the standing-wave generated in the guide member 21 is prevented from being approximated to a standing-wave generated when the guide member 21 is resonated alone, thereby improving the efficiency. Furthermore, if the area of the fixing surface 52a of the fixing member 52, which is the fixing portion secured to the guide member 21, is reduced, then an internal stress generated by a difference between thermal expansion coefficients of the guide member 21 and the fixing member 52 can be reduced and the ultrasonic vibrator 24 can be prevented from being detached from the guide member 21.

While the fixing member 52 such as the aluminum extrusion molded member, the ceramic material member or the like is secured to the piezoelectric ceramic dummy layer 51 having no electrode, for example, as described above, the fixing member 52 is not limited thereto and might be formed by molding the dummy layer 51 and the fixing member 52 unitarily by the ceramics or the like, which can make the tape guide apparatus more inexpensive.

Further, according to the present invention, the length L of the ultrasonic vibrator 24 in which the ultrasonic vibrator 24 is secured to the guide member 21 in the diametrical direction is selected to be optimum so that the friction coefficient of the friction generated when the tape and the guide member 21 contact with each other is minimized.

FIG. 3 of the accompanying drawings shows the condition of the standing-wave vibrations caused of the guide member 21 when the AC voltage is applied to the ultrasonic vibrator 24. In FIG. 3, the ordinate represents a displacement in the radial direction and this condition represents the condition such that ultrasonic vibrator 24 vibrates up to the maximum amplitude position of the vibration cycle. Therefore, the vibration is displaced to the position shown by broken lines in FIG. 3 after the one-half cycle.

Dotted lines N—N represent nodes on the guide member 21 where the vibrations have zero amplitude. The nodes N on the guide member 21 are axially spaced from the ends of the guide member 21 by a distance n, and the support protrusions 19b are also axially spaced from the ends of the guide member 21 by the distance n as shown in FIG. 4.

Figure 1:
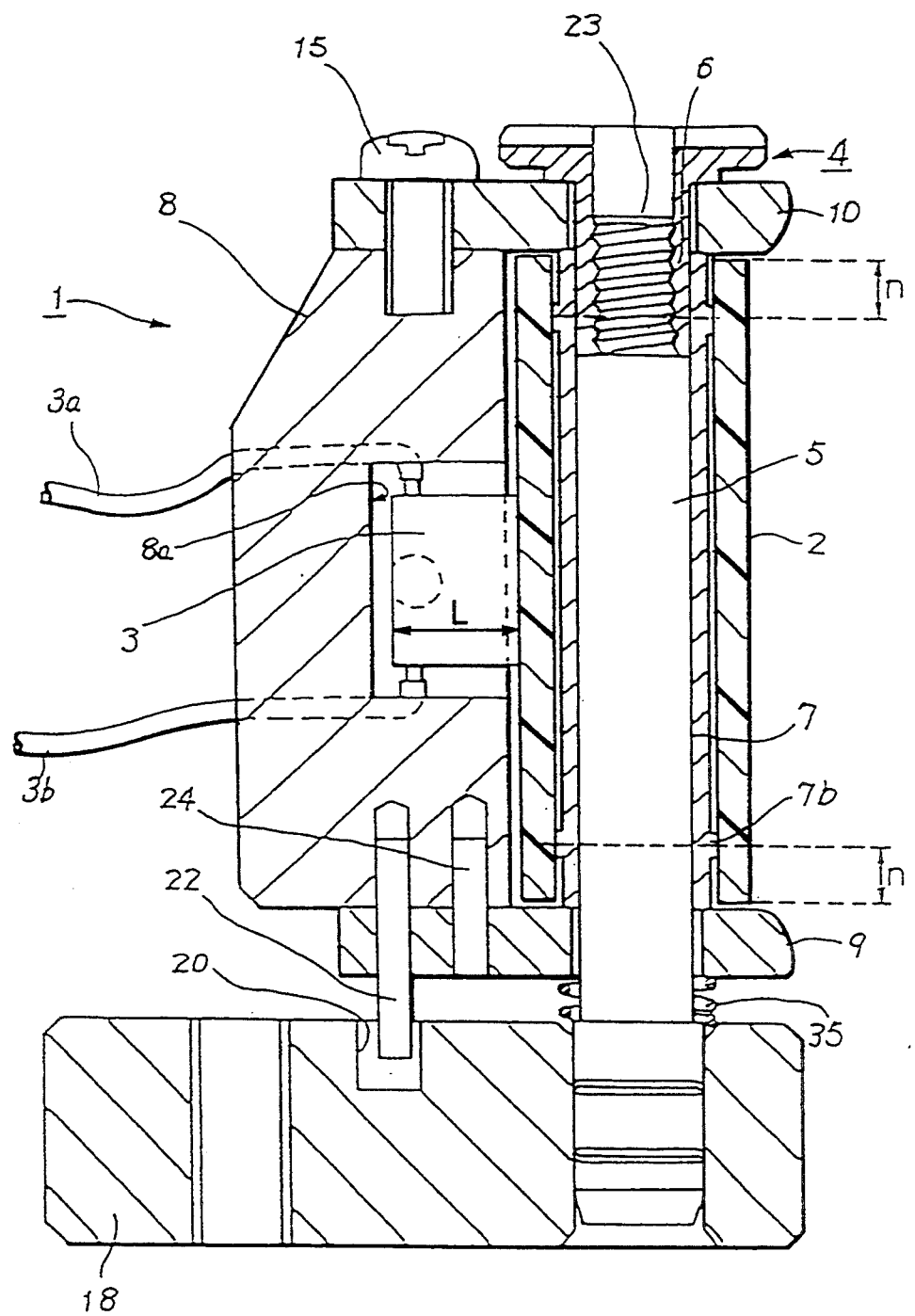
FIG. 1 is a cross-sectional view illustrating an example of a tape guide device according to the prior art.
Figure 2:
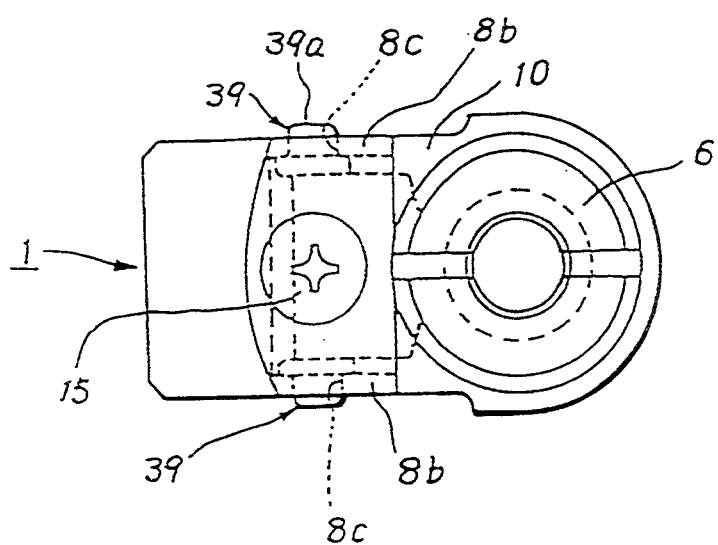
FIG. 2 is a plan view of FIG. 1.

The magnitude of the amplitude is substantially proportional to the magnitude of the input voltage, while the coefficient of friction becomes small in proportion to the magnitude of the amplitude. Therefore, in order to reduce the coefficient of friction, the magnitude of the input voltage must be increased. The length L of the ultrasonic vibrator 24 in which the ultrasonic vibrator 24 is attached to the guide member 21 in the diametrical direction as shown in FIG. 1 is enumerated as one of important factors associated with the degree of friction coefficient.

Figure 14:
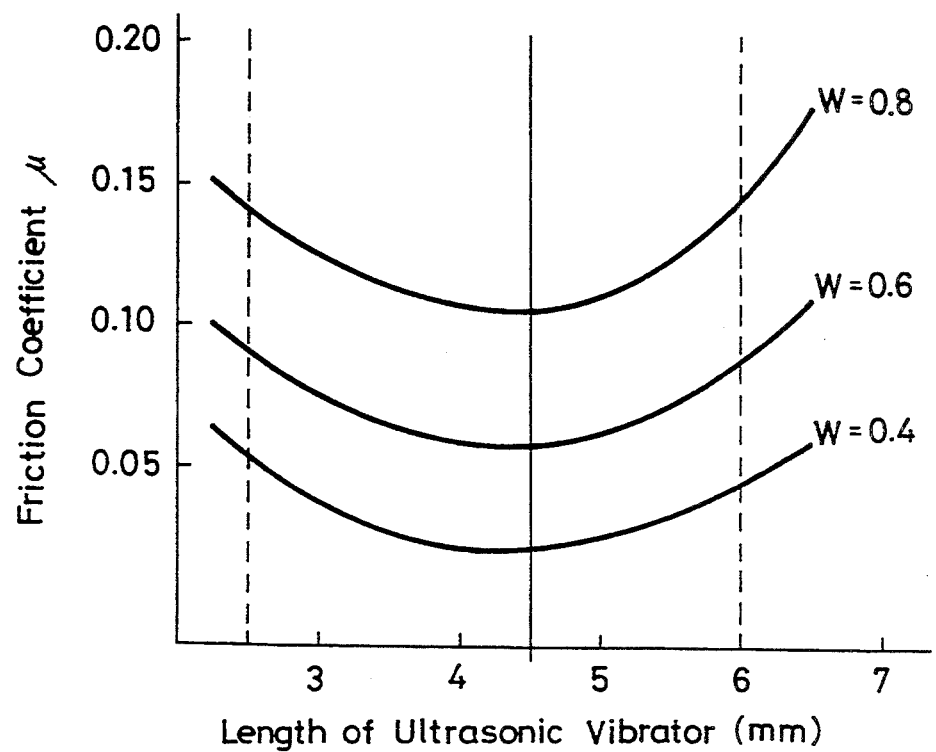
FIGS. 14 and 15 are graphs used to explain operation of the tape guide device according to the present invention.

FIG. 14 shows curves of measured results in a graph having a lefthand vertical axis representative of the friction coefficient $\mu$ and a horizontal axis representative of the length L (mm) of the ultrasonic vibrator 24 in which the ultrasonic vibrator 24 is attached to the guide member 21 in the diametrical direction when voltages 0.4 (W), 0.6 (W) and 0.8 (W) are applied to the ultrasonic vibrator 24, respectively.

Study of FIG. 14 indicates that the friction coefficient $\mu$ is constantly minimized regardless of the change of the value of the input voltage when the length L of the ultrasonic vibrator 24 in which the ultrasonic vibrator 24 is attached to the guide member 21 in the diametrical direction is 4.5 mm.

Figure 15:
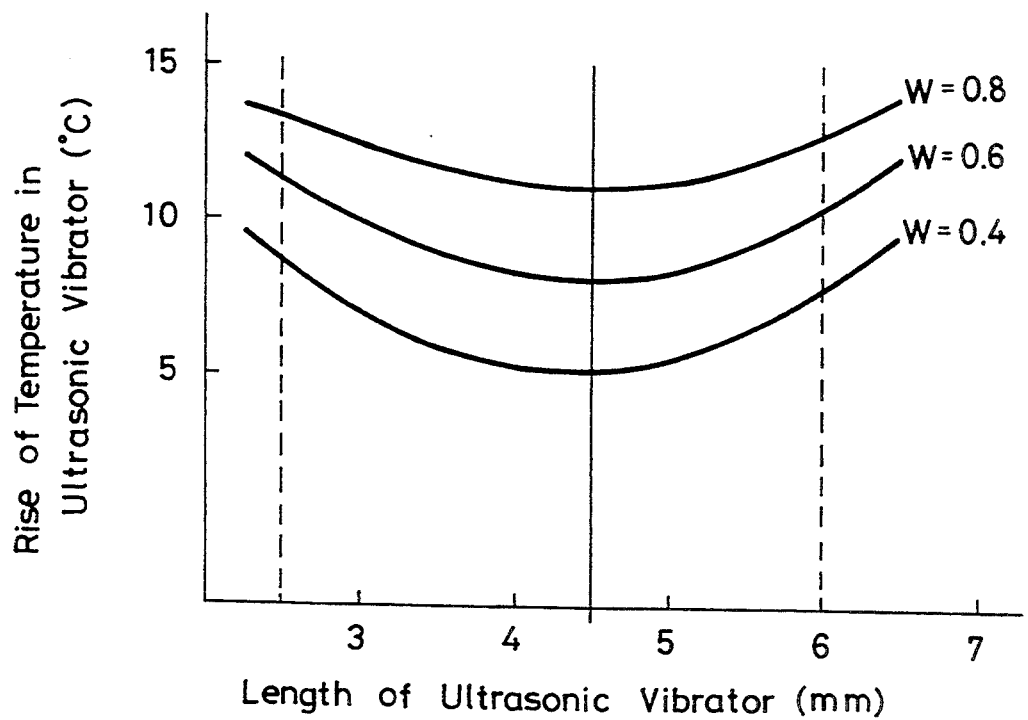

FIG. 15 shows curves of measures results in a graph having a lefthand vertical axis representative of the rise of temperature (° C.) as compared with the case that no voltage is applied to the ultrasonic vibrator 24 and a horizontal axis representative of the length L (mm) of the ultrasonic vibrator 24 in which the ultrasonic vibrator 24 is attached to the guide member 21 in the diametrical direction when voltages 0.4 (W). 0.6 (W) and 0.8 (W) are applied to the ultrasonic vibrator 24, respectively.

Study of FIG. 15 indicates that the rise of temperature as compared with the case such that no voltage is applied to the ultrasonic vibrator 24 is constantly minimized regardless of the change of the value of the input voltage when the length L of the ultrasonic vibrator 24 in which the ultrasonic vibrator 24 is attached to the guide member 21 in the diametrical direction is 4.5 mm.

Measured data in FIGS. 14 and 15 are obtained when the guide member 21 is 5 mm in inner diameter, 7 mm in outer diameter and 19.5 mm in length, for example. Accordingly, the length L has an optimum value associated with the dimension of the guide member 21 so as to minimize the friction coefficient $\mu$, and this optimum value of the length L can be calculated as:

(outer diameter + inner diameter) of the guide member/2.5

Furthermore, as is clear from FIGS. 13 and 14, the value of the friction coefficient $\mu$ of approximately ±30% relative to the optimum length L of the ultrasonic vibrator 24 can be employed in actual practice.

L assumes the length of the ultrasonic vibrator 24 in which the ultrasonic vibrator 24 is attached to the guide member 21 in the diametrical direction, D assumes the outer diameter of the guide member 21 and d assumes the inner diameter of the guide member 21. Then, the optimum length L of the ultrasonic vibrator 24 in which the ultrasonic vibrator 24 is attached to the guide member 21 in the diametrical direction is expressed as:

$$(D+d) \times 0.2 \leq L \leq (D+d) \times 0.5$$

When the AC voltage from the video tape recorder body, for example is supplied through the lead wires 30a, 30b to the ultrasonic vibrator 24 of the tape guide device 21 in which the guide member 21 is 5 mm in inner diameter, 7 mm in outer diameter and 19.5 mm in length and the length of the ultrasonic vibrator 24 in which the ultrasonic vibrator 24 is attached to the guide member 21 in the diametrical direction is 4.5 mm, standing-waves are generated in the guide member 21.

The friction coefficient of the friction generated by the contact of the tape and the tape guide when the tape is guided by the tape guide device 17 to run in this condition is reduced to a very small fraction of that of the case such that the AC voltage is not supplied to the ultrasonic vibrator 24.

Furthermore, since the length L of the ultrasonic vibrator 24 in which the ultrasonic vibrator 24 is attached to the guide member 21 in the diametrical direction is selected to be optimum on the basis of the equation $(D+d) \times 0.2 \leq L \leq (D+d) \times 0.5$ where L is the length of the ultrasonic vibrator 24 in which the ultrasonic vibrator 24 is attached to the guide member 21 in the diametrical direction, D is the outer diameter of the guide member 21 and d is the inner diameter of the guide member 21, the length of the ultrasonic vibrator 24 is optimized and efficiency at which the friction generated by the contact of the tape and the guide member 24 is reduced is maximized, thereby the rise of temperature in the ultrasonic vibrator 24 being suppressed at maximum.

Having described the preferred embodiment of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A tape guide device including a guide member of a cylindrical configuration for guiding a tape, an ultrasonic vibrator secured to said guide member for vibrating said guide member in standing wave configuration and a supporting member for supporting said guide member, said tape guide device further comprising:

(a) a pair of tape position restricting means for restricting a position of said tape with respect to a transverse direction of said tape; and (b) rotation preventing means for preventing rotation of said guide member which is homogeneously formed with at least one of said pair of tape position restricting means, said rotation preventing means being a rotation stop member forming one of said pair of tape restricting means including a recessed portion into which said supporting member is insertably received and retained.

2. A tape guide device according to claim 1, wherein said rotation preventing means comprises a pin member provided on one of the tape position restricting means, said one tape position restricting means being located on a base to which said supporting member is secured, and an engaging member secured at a predetermined position of said base for engaging said pin member.

3. A tape guide device according to claim 2, wherein said rotating preventing means further includes a rotation stop member secured to one of said tape position restricting means for contacting said ultrasonic vibrator so that rotation of said ultrasonic vibrator is prevented.

4. A tape guide device according to claim 2, wherein said rotation preventing means includes a recess portion formed on said guide member and to which said pin member is fitted.

5. A tape guide device according to claim 1, wherein said ultrasonic vibrator comprises a drive layer which is driven in response to the application of a drive signal and a non-drive layer which is not driven by the application of said drive signal, said non-drive layer being secured to said guide member.

6. A tape guide device according to claim 5, wherein an area in which said non-drive layer contacts with said guide member is smaller than an area in which said non-drive layer contacts with said drive layer in said ultrasonic vibrator.

7. A tape guide device according to claim 5, wherein said guide member is made of a conductive material.

8. A tape guide device according to claim 1, wherein said ultrasonic vibrator is of an optimal length represented by the equation:

outer diameter+inner diameter of the guide member/2.5 such that a coefficient of friction between said guide member and said tape is minimized.

9. A tape guide device according to claim 1, wherein said supporting member comprises a support shaft vertically secured to a base on which said rotation preventing means is supported and annular-shaped guide support means made of a soft material provides on said support shaft in an opposing relation to nodes of standing waves.

* * * * *